United States Patent [19]

Hickman

[11] 3,999,667
[45] Dec. 28, 1976

[54] DRAG BUCKET CHAIN CONVEYOR

[75] Inventor: Winford B. Hickman, Spokane, Wash.

[73] Assignee: Atlas Spokane, Inc., Spokane, Wash.

[22] Filed: Nov. 13, 1975

[21] Appl. No.: 631,497

[52] U.S. Cl. .................................. 214/10; 198/509; 198/723; 214/17 D

[51] Int. Cl.[2] ......................................... B65G 65/42

[58] Field of Search ............. 214/10, 17 D, 17 DA; 198/212, 36

[56] References Cited

UNITED STATES PATENTS

| | | | |
|---|---|---|---|
| 3,011,658 | 12/1961 | Peterson | 214/10 |
| 3,610,444 | 10/1971 | Vanhoff | 214/10 |

*Primary Examiner*—Robert J. Spar
*Assistant Examiner*—George F. Abraham
*Attorney, Agent, or Firm*—Wells, St. John & Roberts

[57] ABSTRACT

A chain of pivotably interconnected drag buckets for removing material from the sides of a loose pile and for delivering the material to a secondary discharge conveyor. The drag bucket assembly is particularly designed to be pulled about a circular path and includes a forward end adapted to be connected to a towing device and a free rearward end loosely received on a flat supporting surface. As the forward drag bucket is pulled along, the remaining buckets move in the circular path but also migrate radially inwardly toward the storage pile. The buckets scrape along the sides of the pile to remove material and move it along the support surface to openings where the material drops onto a discharge conveyor. The buckets are particularly designed so that flexure along the length of the chain will not cause openings to be formed between adjacent buckets.

17 Claims, 7 Drawing Figures

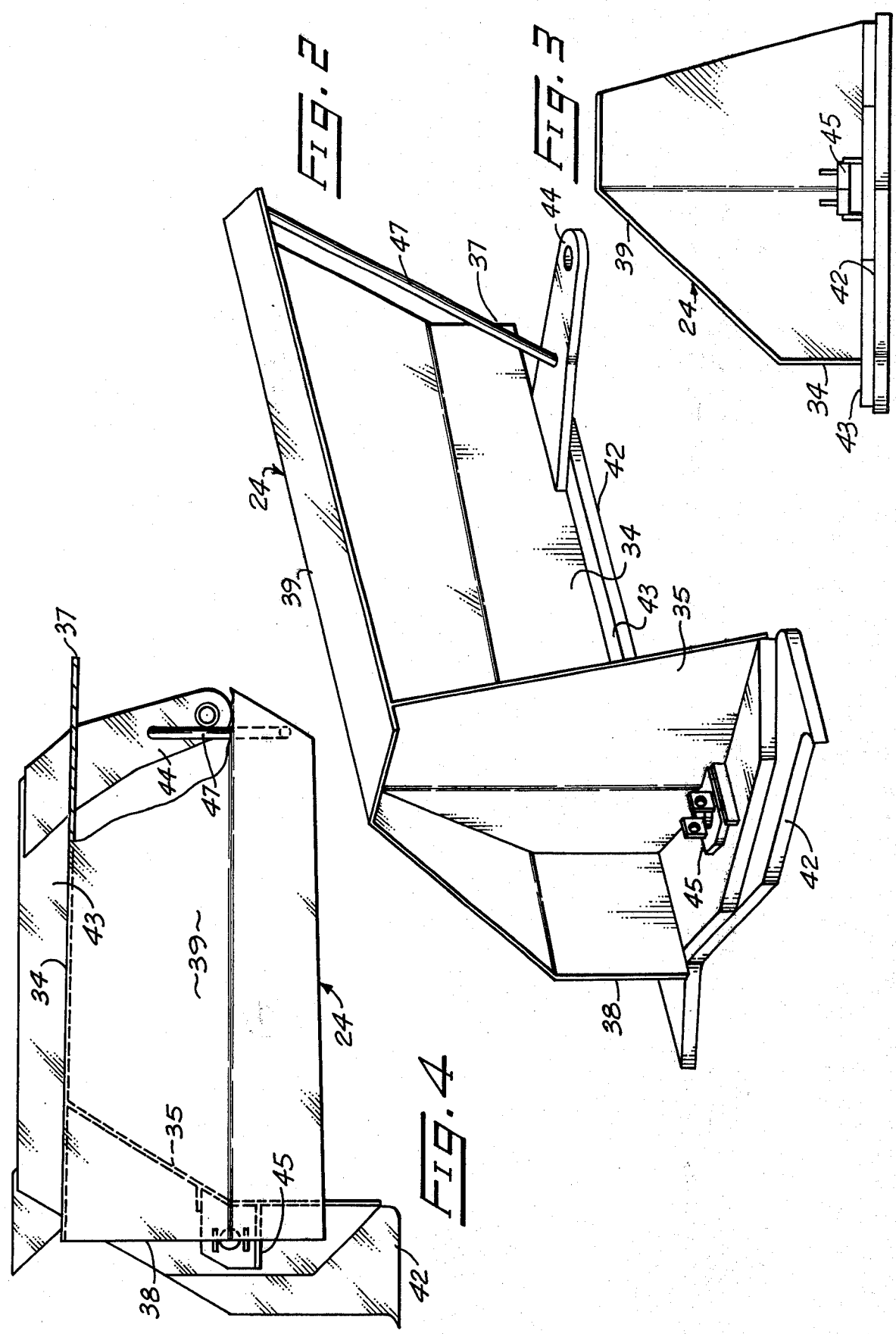

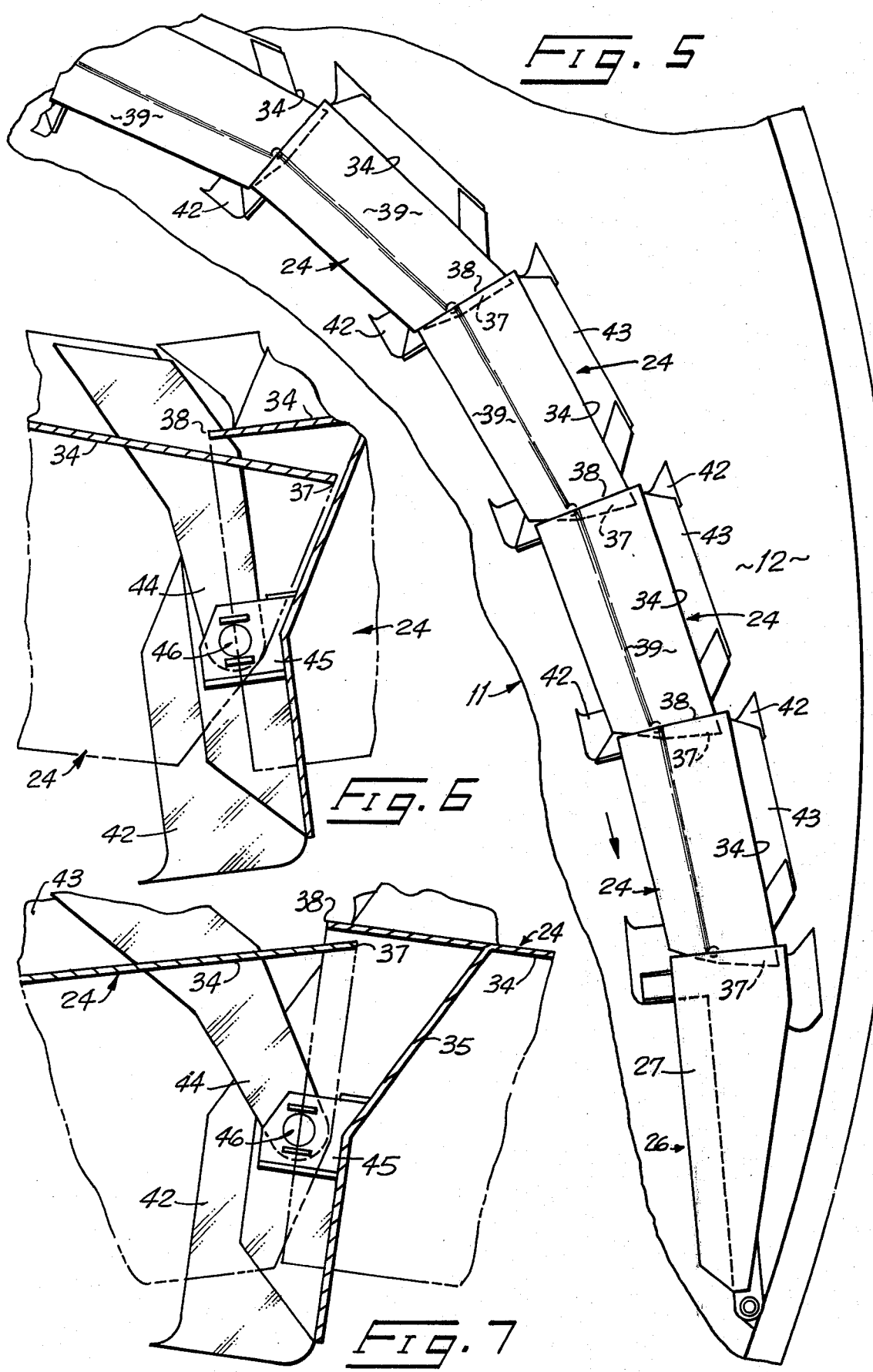

3,999,667

DRAG BUCKET CHAIN CONVEYOR

BACKGROUND OF THE INVENTION

The present invention is related to apparatus adapted to transfer controlled volumes of particles from a storage pile and more particularly to drag chain conveyor assemblies whereby the material is removed from sides of the storage pile.

Many particulate materials such as ensilage, sawdust, vermiculite and others are stored in piles for later removal. Often, some type of control is necessary to enable delivery of the material at a constant volume. This is particularly important in the lumber industry where sawdust is often utilized as a fuel for lumber drying kilns. A continuous even volume of sawdust is necessary to operate a drier burner at optimum efficiency.

Ordinarily, particulate material is delivered to selected locations by conveyors. The method by which the particulate material is taken from a storage pile has, however, presented some problem. Sawdust in particular has a tendency to bridge over a conveyor inlet so as to block the inlet and thereby make volume control impossible.

U.S. Pat. No. 3,011,658 granted Dec. 5, 1961 discloses an apparatus by which the material may be effectively delivered from a storage pile to a delivery or discharge conveyor. By placing the storage pile at the center of a circular ring and dragging a number of interconnected scoops about the pile, an effective method of delivering material to a discharge conveyor is achieved. However, some difficulty has been noted in the particular configuration of the drag chain assemblies. Previously, such assemblies have been formed of loosely interconnected scoops or drag chain buckets. These buckets are pivoted at either longitudinal end to adjacent buckets. The connection points for the buckets are positioned between the individual buckets so that a gap is formed between adjacent buckets as the chain is moved about a circular path. Loose material will build up between these gaps and often will bind between adjacent buckets and thereby inhibit the flexibility of the entire chain. Flexibility of the chain is necessary in that the storage pile is ordinarily constantly changing in volume. The chains must flex in both an inward and outward direction so the bucket assembly may remain in contact with the pile sides. Ordinarily, material is delivered to the top of a pile. As the pile increases in size, the sides move outwardly and, as a result, force the drag bucket chain assemblies radially outward from the center of the stack. When material has been bound between the adjacent buckets, flexure of the chain is impaired and it (the chain) can no longer conform to the ever increasing stack radius. As the pulling ring continues to rotate the chains, the requirement for power to cause this rotation will increase and the efficiency of the delivery system will decrease.

It has therefore become desirable to obtain an improved form of drag bucket chain assemblies whereby no gap is created between adjacent individual drag buckets and therefore no binding of material between buckets may be possible.

SUMMARY OF THE INVENTION

An improved flexible drag bucket conveyor assembly is described for particle transfer apparatus wherein a storage pile is formed at the center of a horizontal support. A powered pulling ring encircles the storage pile. A flexible drag conveyor is secured at a forward end to the ring, the remaining end of the flexible drag conveyor being capable of sliding freely along the horizontal support. Also included with the particle transfer apparatus are recessed conveyors that operate below the pile and below the surface of the support. The improved flexible drag bucket conveyor assembly is comprised of an elongated chain of interconnected drag buckets. The chain includes a forward end that is pivotably connected to the ring and a free rearward end that will slide frictionally inside the ring over the support surface in response to rotation of the ring. The buckets included between ends of the chain each include outward side walls and rearward end walls. Material will gather against these walls as the chain is pulled about the circular path in order to deliver material from the storage pile to the recessed conveyors below. The rearward end of each bucket overlaps the forward end of an adjacent bucket so the entire chain may be bent in either a direction toward the center of the ring or away from the center without forming gaps between the individual adjacent buckets.

It is a primary object of the present invention to provide an improved flexible drag bucket conveyor assembly whereby material may not be received to compact between adjacent bucket members to inhibit flexure of the chain along its length.

Another object is to provide such an assembly that includes provisions for increasing the operational life of the assembly.

A still further object is to provide such an assembly whereby individual drag buckets may be added to or removed from the length of the chain conveyor with relative ease.

These and yet further objects and advantages will become apparent upon reading the following description which, along with the accompanying drawings, disclose a preferred form of the present invention. It should be noted, however, that the following description and attached drawings are only given in an exemplary form to describe a single preferred form of the invention. It is understood that various components therein may be modified without departing from the scope of the invention. Therefore, only the claims to be found at the end of this specification are to be taken as definitions and limitations upon the scope of the present invention.

BRIEF DESCRIPTION OF THE DRAWINGS

FIG. 2 is a pictorial detail view of a single drag bucket element;

FIG. 3 is an end view as shown from the left hand side of FIG. 2;

FIG. 4 is a plan view of the bucket shown in FIGS. 2 and 3;

FIG. 5 is a fragmentary view on a larger scale than that shown in FIG. 1 showing operation of the present assembly;

FIG. 6 is an enlarged section view showing flexure of two adjacent bucket elements in one direction; and FIG. 7 is a view similar to FIG. 6 only showing flexure of the adjacent buckets in a different direction.

DETAILED DESCRIPTION OF A PREFERRED EMBODIMENT

Figure 1:
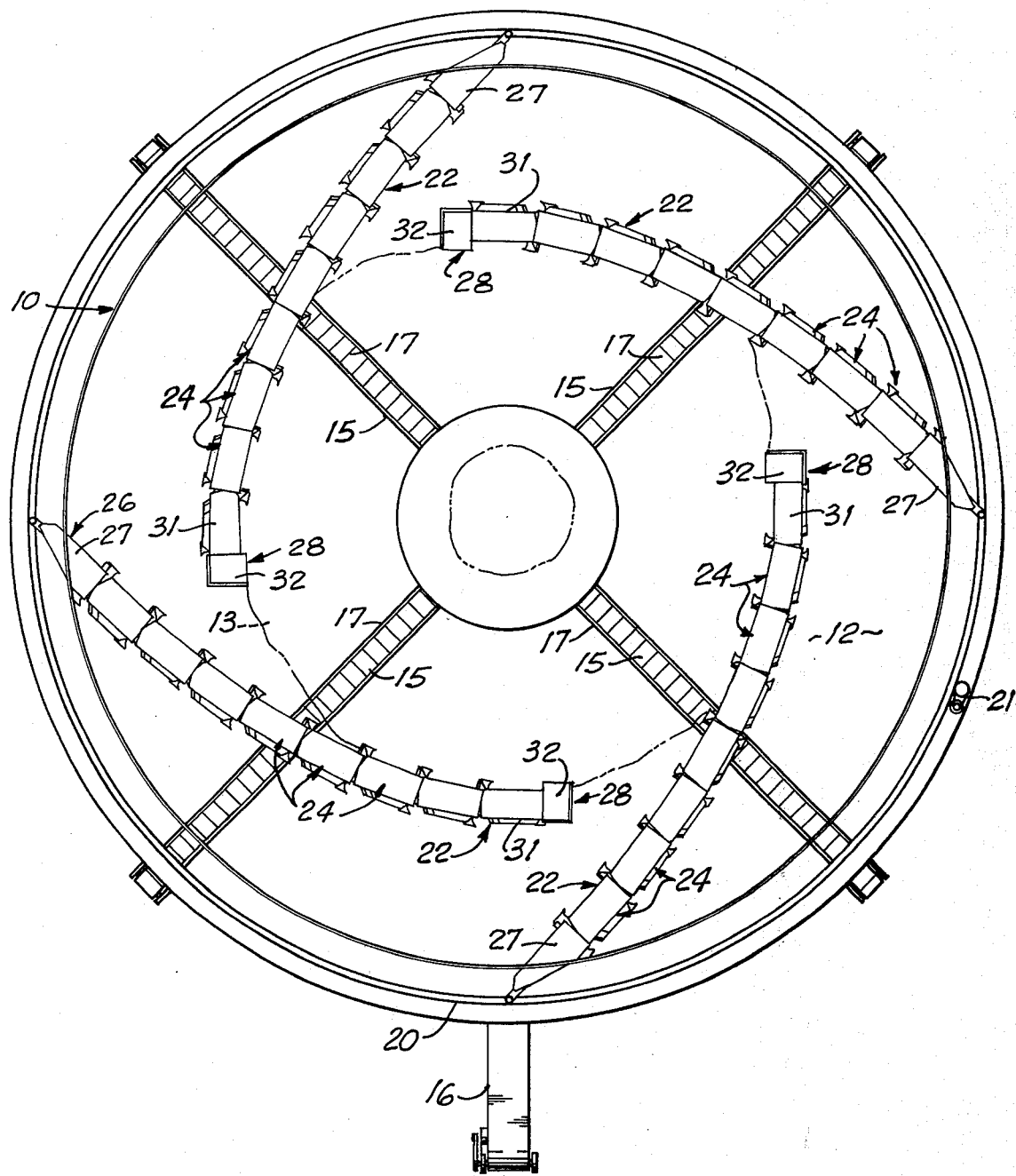
FIG. 1 is a diagrammatic plan view of the present invention in operation in conjunction with a particle transfer mechanism.

This invention is designed to improve existing apparatus utilized to remove and deliver particles from a storage pile to a discharge conveyor or other delivry system. Bulk goods, such as sawdust, are ordinarily dumped in a stack which, unless confined, will be conical in shape. A bin 10 for receiving such a storage pile is graphically illustrated in FIG. 1 of the drawings. Within bin 10, the storage pile 13 is placed on a support bed 12. This bed may be formed of any suitable material, the only requirement being that it include a horizontal planar upper surface and that it be somewhat hard for bearing purposes. A number of recessed delivery conveyors 15 are located below the support surface for receiving and moving material to a main delivery or exit conveyor 16. Conveyors 15 converge at the center of the support surface 12 to dump their contents at a central location onto the working flight of discharge conveyor 16. The conveyors 15 are covered by grates 17 positioned coplanar with the support surface 12. The grates serve to protect the conveyors from pressure of the storage pile.

The present drag chain assembly is utilized to remove particles from the sides of the pile 13 and drag them across the grates to drop onto conveyors 15 below. A driven ring 20 is provided outside the walls of bin 10 that is driven by means 21 to rotate about the central bin axis. The present drag chain conveyor assemblies are adapted to be connected to this ring in order that the may be pulled about in a circular path against the sides of pile 13.

The apparatus as generally discussed up to this point in this application is described in greater detail in Patent No. 3,011,658. The primary concern of the present invention lies only within the structure of a new and useful improvement in the drag chain conveyor assembly shown in that patent.

The present improvement lies within a particular configuration of the individual drag bucket units comprising the flexible drag conveyor chains 22. This configuration allows a substantial degree of flex along the length of the individual chains while preventing material from entering between individual buckets and thereby inhibiting flexure of the chain.

The improved flexible drag chain conveyors 22 are simply comprised of pivotably connected independent drag chain buckets. Each chain 22 includes a forward bucket 27 at a forward chain end 26 that is adapted to be pivotably connected to ring 20. The rear chain ends 28 are defined by rear buckets 31. Each bucket 31 includes a drag weight 32 that serves to produce an additional amount of drag along the full length of the attached chain. Intermediate drag buckets 24 are pivotably connected between forward chain end 26 and rear chain end 28. All buckets 24, 27 and 31 may be utilized as scoops for removing material from sides of the pile and sliding it along surface 12 to the recessed delivery conveyors 15.

A single intermediate bucket assembly is shown in detail by FIGS. 2 through 4. All the buckets 24 between front and rear buckets 27 and 31 are identical to that shown in FIGS. 2 through 4. The front and rear buckets differ only in that the front bucket is adapted to connect to ring 20 and rear bucket 31 is designed to receive weight 32.

Each bucket 24 includes a side wall 34 that extends substantially longitudinally between a forward bucket end 37 and a rearward end 38. A hood member 39 extends upwardly and inwardly from the wall 34. Hood 39 covers an end wall 35 that is located slightly inwardly of the rearward bucket end 38. End wall 35, side wall 34, and hood 39, together with the end wall 35 of an adjacent bucket in chain 22, form an inward and downwardly open enclosure.

Hood 39 is inclined elevationally from rearward end 38 to forward bucket end 37. Forward end 37 is spaced elevationally below rearward end 38 by a distance greater than the thickness of the material comprising hood 39. Therefore, adjacent bucket may fit together, with the forward end 37 of one bucket being located forwardly of the rearward end of the adjacent bucket. This situation is shown in FIGS. 5 through 7.

The sides 34 of buckets 24 lead angularly inward from the rear bucket ends 38 to the forward ends 37. This provision allows for pivotal movement of adjacent buckets relative to one another while allowing no material from the pile to escape or collect between adjacent buckets.

Hood 39, side walls 34, and end wall 35 all rest upon a wear shoe 42. The wear shoe is L-shaped in configuration to receive the entire weight of the remaining portions of the bucket assembly. Shoes 42 are removable from the bucket assemblies to facilitate replacement thereof without necessitating replacement of the remaining bucket elements. It is intended that these shoes be constructed of a material less wear resistant than surface 12. These shoes may be replaced easily once they become worn from frictional movement about surface 12.

Also included with each bucket assembly is a C-shaped towing link 43. Each link 43 includes a front connector 44 at a forward end and a rear connector 45 at a rearward end. The front connector 44 is located slightly inward of the forward bucket end and upwardly adjacent to the elevation of support surface 12. Rearward connector 45 is located between rearward bucket end 38 and end wall 35.

The rear connector is designed to receive the front connector of an adjacent bucket assembly. A pin 46, (FIGS. 6 and 7) extends through aligned holes in connectors 44 and 45 to pivotably link the bucket assemblies together. It may be noted in FIG. 4 that the forward connector 44 is located closer to the side wall 34 than is the rearward connector 45. This arrangement facilitates positioning of side wall 34 of one bucket inwardly adjacent to the same side wall 34 of an adjacent pivotably attached bucket 24.

A brace member 47 extends angularly between forward connector 44 and the above portion of hood 39. Brace members serve simply to stabilize and support the otherwise cantilevered hood 39.

It may be understood that the walls 34 and hoods 39 of adjacent buckets substantially overlap one another in such a way that no longitudinal gap may be formed between adjacent buckets while the chain is flexed toward or away from the pile. This overlapping arrangement prevents material from entering and binding between the forward end of one bucket and the rearward end of an adjacent bucket where it could possibly bind and inhibit flexible movement of the entire chain.

Prior to operation of the present bucket assembly, the chains 22 are formed inside ring 20 by interconnecting the individual buckets together and connecting the foward bucket 27 to ring 20. The buckets are connected together so that their open sides face the pile and their closed sides or walls 34 face the ring 20.

When the ring is actuated to rotate in a direction as indicated by the arrow in FIG. 1, the drag from the sliding chains 22 cause the rearward buckets to migrate radially inward toward the center of bin 10. Inward movement is stopped as the buckets engage and slide around the periphery of the material pile. As this happens, the end walls 35 act as scrapers to remove material from the pile side. Side walls 34 prevent the removed materials from escaping behind the bucket assemblies.

The trapped material is then dragged along the support surface 12 until it is moved over one of the recessed delivery conveyors 15. At this point, the material drops through the open bottom sides of the buckets and onto the working flights of conveyors 15. The constant tendency for the buckets to move inwardly toward the center of pile 13 assures that constant contact will be made between the pile sides and chains 24.

The chains, when in operation, are curved along their lengths from the forward buckets 27 to rear buckets 31. Ordinarily, if the buckets were simply hinged together, a gap would result between each bucket as the chain flexes along its length. However, as shown in FIGS. 6 and 7, the overlapping side walls 34 and hoods 39 prevent this from happening.

In FIG. 6, two adjacent buckets have been flexed about their pivot connection in an opposite direction as that shown in FIG. 1 and 5. This circumstance could occur when additional material is added to the stack to force the buckets back radially outward toward the ring 20. However, the relationship shown in FIG. 6 is extreme and would not ordinarily occur.

The situation shown in FIG. 7 is also an extreme position. The adjacent buckets in this positon are shown as being bent about their pivot connection in a direction opposite to that shown in FIGS. 5 and 6. In this condition, the two buckets will remain in an overlapping condition to prevent an open gap from occurring between the forward end of one bucket and the rearward end of the adjacent bucket.

The angular sides 34 of adjacent buckets are offset and overlapping so they will not interfere with one another during relative pivotal movement.

The direction of rotation or movement of the buckets about the surface 12 is noted in FIG. 5. This direction movement results in the end wall 35 of each bucket engaging the pile ahead of the pivotal connection for the adjacent bucket. Therefore, the pivoted connections are somewhat sheltered from incoming material. This feature, in addition to the features described for preventing a gap from occurring between adjacent buckets, effectively serves to prevent material buildup from between the relatively movable surfaces of adjacent buckets.

The buckets engaging the pile sides will receive equal amounts of material and will therefore deliver a constant stream of material to the grates 17. If the ring 20 is driven at a constant speed, the output flow of material will be uniform and predictable.

It may have become evident upon reading the above description with reference to the attached drawings that various changes and modifications may be made therein without departing from the intended scope of my invention. Therefore, only the following claims are to be taken as definitions and as placing restrictions upon the scope of the present invention.

What I claim is:

1. In an apparatus of the type for transferring particles from a storage pile including a horizontal suppot for the pile and with recessed conveyors extending below the surface of the support with ring means encircling the pile and rotatably supported on said support for movement about a vertical axis and a flexible drag conveyor secured at one end to the inner cylindrical surface of said ring means freely mounted to swing radially with respect to said ring, and drive means operatively connected to said ring means adapted to rotate the ring means to pull the flexible drag conveyor about said vertical axis, an improved flexible drag bucket conveyor assembly, comprising:

a chain of pivotably interconnected drag buckets, the chain having a forward end pivotably connected to the ring means and a free rearward end for sliding movement over the surface of the support inside the ring in response to rotation of the ring;

wherein the buckets between the ends of the chain each include a forward and rearward end with an outward longitudinal side wall and a rearward end wall covered by a hood joined to the side wall;

wherein said end wall is spaced forwardly of the rear bucket end; and wherein the rearward end of each bucket overlaps the forward end of an adjacent bucket so the chain may bend without gaps opening between adjacent buckets.

2. The improvement as defined by claim 1 wherein the buckets are open across their bottom sides so material may be gathered against the side walls and end walls and moved along the suppot over the recessed conveyors where it may fall freely through the open bottom sides.

3. The combination as set out by claim 1 wherein the side and end walls are provided with replaceable wear shoes for frictionally engaging the surface of the support.

4. The combination as set out by claim 1 wherein the individual drag buckets are connected together by C-shaped links that extend along the length of each bucket closely adjacent the support surface, and wherein pivot connections are located at opposite ends of the C-shaped links.

5. The combination as set out in claim 4 wherein the pivot connections of each link are elevationally offset so one pivot connection will mate with the opposite connection of an adjacent drag bucket.

6. The combination as set out by claim 1 wherein the hoods are elevationally inclined so the hood of one bucket end may overlap the hood at an opposite end of an adjacent bucket.

7. The combination as set out by claim 4 wherein the bucket side walls lead angularly inward from the rearward ends to forward ends so that the forward pivot connections are spaced closer to the side wall at the forward bucket ends than the rear connections are spaced from the side walls at the rear bucket ends, whereby two buckets may be joined without interference between adjacent overlapping side walls.

8. The combination as set out by claim 1 wherein the end of the drag bucket chain is defined by an end drag bucket having a forward end pivotably connnected to an adjacent bucket and a weighted rearward end for applying a drag resistance at the rear chain end.

9. The combination as set out by claim 1 wherein each bucket includes a foward and a rearward pivot connection for receiving and mounting complementary pivot connections of adjacent buckets and wherein the forward pivot connection is spaced closer to the side wall than the rearward connection.

10. A flexible drag bucket assembly, comprising:
a chain of pivotably interconnected drag buckets having a forward end adapted to be connected to a pulling mechanism and a free rear end;
wherein the buckets between the ends of the chain each include a forward and rearward end with an outward longitudinal side wall and a rearward end wall covered by a hood joined to the side wall;
wherein said end wall is spaced forwardly of the rear bucket end; and
wherein the rearward end of each bucket overlaps the forward end of an adjacent bucket so the chain may bend without gaps opening between adjacent buckets.

11. The assembly as defined by claim 10 wherein each bucket is open across its bottom side and wherein the side end wall is provided with a replaceable wear shoe along the bottom bucket side.

12. The assembly as set out by claim 10 wherein the individual drag buckets are connected together by C-shaped links that extend along the length of each bucket, and wherein pivot connections are located at opposite ends of the C-shaped links.

13. The assembly as set out in claim 12 wherein the pivot connections of each link are elevationally offset so one pivot connection will mate with the opposite connection of an adjacent drag bucket.

14. The assembly as set out by claim 10 wherein the hoods are elevationally inclined so the hood of one bucket end may overlap the hood at a opposite end of an adjacent bucket.

15. The combination as set out by claim 12 wherein the bucket side walls lead angularly inward from the rearward ends to forward ends so that the forward pivot connections are spaced closer to the side wall at the forward bucket ends than the rear connections are spaced from the side walls at the rear bucket ends, whereby two buckets may be joined without interference between adjacent overlapping side walls.

16. The assembly as set out by claim 10 wherein the end of the drag bucket chain is defined by an end drag bucket having a forward end pivotably connected to an adjacent bucket and a weighted rearward end for applying a drag resistance at the rear chain end.

17. The combination as set out by claim 10 wherein each bucket includes a forward and rearward pivot connection for receiving and mounting complementary pivot connections of adjacent buckets and wherein the forward pivot connection is spaced closer to the side wall than the rearward connection.

* * * * *